United States Patent

Baumgartner

[15] 3,707,263
[45] Dec. 26, 1972

[54] HEATING ARRANGEMENT FOR A VEHICLE

[72] Inventor: Helmut Baumgartner, Fallersleben, Germany

[73] Assignee: Volkswagenwerk Aktiengesellschaft, Wolfsburg, Germany

[22] Filed: Nov. 18, 1970

[21] Appl. No.: 90,605

[30] Foreign Application Priority Data

Dec. 10, 1969 Germany.....................P 19 61 831.6

[52] U.S. Cl. ............................................237/12.3 C
[51] Int. Cl. ..............................................B60h 1/14
[58] Field of Search............237/12.3 C; 123/142.5 R

[56] References Cited

UNITED STATES PATENTS

| 2,291,654 | 8/1942 | Samiran | 123/142.5 R |
| 2,323,525 | 7/1943 | Ebel et al. | 123/136 UX |
| 2,993,487 | 7/1961 | Konrad | 123/142.5 R |

Primary Examiner—Edward J. Michael
Attorney—Ernest F. Marmorek

[57] ABSTRACT

A motor vehicle comprising an injection-type engine, a gas tank, a feed conduit for supplying fuel to the engine under excess pressure from the tank, and a fuel return line connected between the engine and the tank, the return line being under reduced pressure, in combination with a heating device operable with the same type of fuel as the engine, a bubble separator connecting the heating device to the fuel return line and adapted to separate the bubbles formed in the return line.

2 Claims, 3 Drawing Figures

PATENTED DEC 26 1972

3,707,263

INVENTOR:
Helmut Baumgartner,
BY
Ernest A. Marmorek,
His Attorney.

HEATING ARRANGEMENT FOR A VEHICLE

FIELD OF THE INVENTION

The present invention relates generally to a heating arrangement for a vehicle and, more particularly, it relates to a supplemental heating arrangement for a motor vehicle which heating arrangement is operated from a common tank through a fuel return line and by the same fuel as the injection motor of the vehicle.

BACKGROUND OF THE INVENTION

It is known to supply a heating arrangement of the above-mentioned type with the necessary fuel from a tank through the fuel feed line leading to the motor. Under this condition it is a requirement that the fuel in the feed line should not be under excess pressure, since such excess pressure would prevent and undermine a proper functioning of the heating arrangement. From thermal and space considerations it is necessary that the fuel pump be placed away from the motor, such as in the neighborhood of the gas tank. In this case the fuel line is under excess pressure; thereby it is not adapted for supplying the fuel to the heating arrangement unless an additional and expensive pressure reducing valve is provided in the line. Even the provision of such additional equipment will not make it possible to operate the heating arrangement when the motor is not running.

Without going into detailed discussion of the disadvantages which might accompany a separate pressureless fuel feedline for the heating arrangement, the invention is described now.

SUMMARY OF THE INVENTION

It is, therefore, an object of the present invention to provide an improved heating arrangement for a motor vehicle having an injection type motor, in which the heating arrangement is operated from the same gas tank as the injection motor and in which the heating arrangement is supplied with the same fuel as the injection motor, but under reduced pressure, and wherein the heating arrangement is capable of operation also when the motor is not running.

It is another object of the present invention to provide an improved heating arrangement for an injection-type motor in which the heating arrangement is operated by the same fuel as the injection motor and wherein the fuel is supplied to the heating arrangement from the fuel return line through a device capable of separating the bubbles usually accompanying the returned fuel.

According to the present invention the fuel necessary for the operation of the heating arrangement is taken off from the fuel return line coming from the injunction-type motor and passed over a bubble separator.

According to the present invention the bubble separator comprises a chamber having an upper region communicating with the return line and which has such a volume that it forms a reserve chamber from which the fuel necessary for the heating arrangement is taken off by a conduit disposed in the lower region of the chamber.

According to the present invention the bubble separator can be made from a transparent or translucent synthetic material, which are inexpensive materials, and has a simple structure but still capable of reliably and continuously supplying the fuel to the heating arrangement during the operation or during the cut-off of the motor.

BRIEF DESCRIPTION OF THE DRAWINGS

The invention will become more readily apparent from the following description of a preferred embodiment thereof shown, by way of example, in the accompanying drawing, in which.

DESCRIPTION OF THE PREFERRED EMBODIMENT

Figure 1:
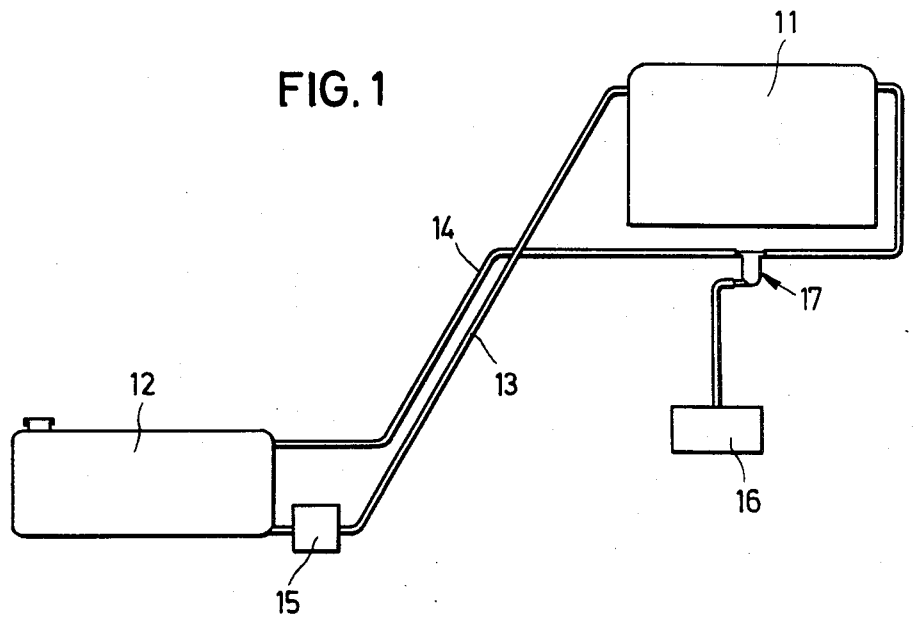
FIG. 1 illustrates in a schematic fashion the fuel circuit of a motor vehicle having an injection-type motor and the heating arrangement connected according to the present invention.
Figure 3:
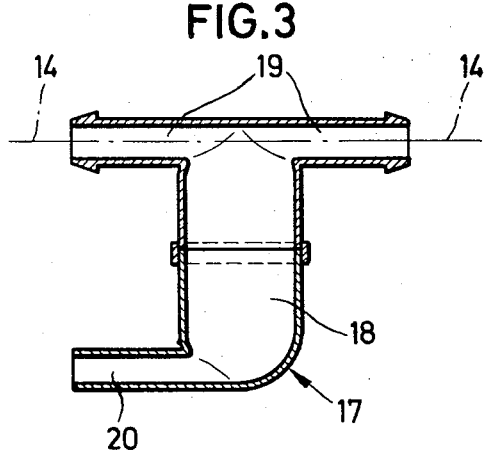
FIG. 3 is a longitudinal sectional view along the line III — III of FIG. 2.
Figure 2:
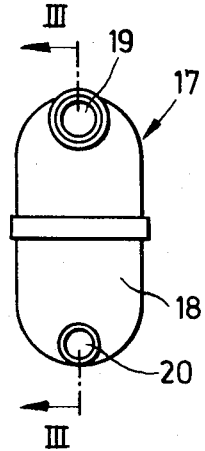
FIG. 2 is a side view of the bubble separator according to the present invention.

The vehicle not shown on the drawing has an injection-type motor 11 and a gas tank 12 which is placed at the end of the vehicle which is far away from the injection-type motor, for safety reasons. The motor 11 and the tank 12 are connected by a fuel feed line 13 and with a fuel return line 14. The fuel is supplied to the motor 11 by means of a fuel pressure pump 15 disposed near the gas tank 12. As a result, the fuel feed line 13 is under excess pressure whereas the fuel passing through the return line 14 and containing bubbles is returned to the tank 12 without being under pressure. From the return line 14 the fuel necessary for the operation of the heating arrangement 16, shown in block form, is taken off by means of a bubble separator 17.

The bubble separator 17 according to the present invention comprises a chamber 18 which in its upper region has a conduit 19 passing therethrough and coupling the separator to the return line 14, and in its lower region has a conduit leading to the heating arrangement 16. With the conduit 19 the bubble separator 17 is connected to the fuel return line 14.

When the engine 11 is running, the fuel streaming through the return line 14 enters the chamber 18 and the bubbles contained in the fuel rise upward and disappear together with the excess fuel in the direction of the tank 12 through the return conduit 14. The volume of chamber 18 is dimensioned so that a reserve chamber is formed, that is, a certain amount of fuel is present in chamber 18 even when the heating arrangement 16 is turned on when the motor is not running. Under the last mentioned condition the fuel will be sucked in from the tank 12 and will fill the chamber 18 in a continuous manner.

From the above, it is apparent that although the invention has been described hereinbefore with respect to a certain specific embodiment thereof, it is evident that many modifications and changes may be made without departing from the spirit of the invention. Accordingly, by the appended claims, I intend to cover all such modifications and changes as fall within the true spirit and scope of this invention.

I claim:

1. A motor vehicle including an injection-type engine, a gas tank, a fuel return line connected between said engine and said tank for returning at reduced pressure excess fuel from said motor into said tank in combination with a vehicle heating device operable with the same type of fuel as said engine, comprising a fuel storage chamber including an upper region and a lower region, an inlet and an outlet in said upper region, said inlet and outlet being interconnected in series with said fuel return line to supply said storage chamber with said fuel and to pass said excess fuel through said upper region, a fuel conduit coupling said lower region to said heating device, said storage chamber thereby separating the bubbles formed in the stored fuel.

2. The combination as claimed in claim 1, wherein said fuel storage chamber at least partially is made from a transparent or translucent material.

* * * * *